United States Patent
Park (10) Patent No.: US 10,039,146 B2
(45) Date of Patent: Jul. 31, 2018

(54) GENERAL PACKET RADIO SERVICE TUNNELING PROTOCOL MULTIPLEXING

(71) Applicant: Sprint Communications Company L.P., Overland Park, KS (US)

(72) Inventor: Sunyong Park, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 49 days.

(21) Appl. No.: 15/210,246

(22) Filed: Jul. 14, 2016

(65) Prior Publication Data

US 2018/0020493 A1   Jan. 18, 2018

(51) Int. Cl.

| | |
|---|---|
| H04W 76/12 | (2018.01) |
| H04B 7/155 | (2006.01) |
| H04L 29/12 | (2006.01) |
| H04L 29/06 | (2006.01) |
| H04W 76/02 | (2009.01) |
| H04W 28/06 | (2009.01) |
| H04W 92/04 | (2009.01) |

(52) U.S. Cl.
CPC ........ H04W 76/12 (2018.02); H04B 7/15528 (2013.01); H04L 61/3075 (2013.01); H04L 69/164 (2013.01); H04L 69/22 (2013.01); H04W 28/065 (2013.01); H04W 76/022 (2013.01); H04W 92/045 (2013.01)

(58) Field of Classification Search
CPC .. H04W 76/022; H04W 76/12; H04L 69/164; H04L 61/3075; H04B 7/15528
See application file for complete search history.

(56) References Cited

U.S. PATENT DOCUMENTS

| | | | |
|---|---|---|---|
| 2011/0019695 A1* | 1/2011 | Wu .................. | H04W 28/06 370/477 |
| 2011/0149848 A1* | 6/2011 | Ho .................. | H04W 28/06 370/328 |
| 2013/0195017 A1 | 8/2013 | Jamadagni et al. | |
| 2014/0064246 A1* | 3/2014 | Baillargeon ....... | H04L 61/2592 370/331 |
| 2016/0127897 A1* | 5/2016 | Lee .................. | H04L 63/06 713/176 |

FOREIGN PATENT DOCUMENTS

| | | |
|---|---|---|
| CN | 101388825 | 3/2009 |
| JP | 2013207514 | 10/2013 |
| WO | 2016180459 | 11/2016 |

* cited by examiner

Primary Examiner — Jianye Wu (57) ABSTRACT

Systems, methods, and software described herein provide enhancements for data communications between a wireless access node and a wireless network gateway. In one implementation, a method of operating a wireless network includes, in the wireless access node, receiving data packets, via wireless signaling, from a plurality of wireless communication devices, generating GPRS Tunneling Protocol (GTP) packets for the data packets, and generating a wrapper for the GTP packets, wherein the wrapper is used to multiplex the GTP packets in a user datagram protocol (UDP) packet. The method further provides, in the wireless access node, transferring the UDP packet to a wireless network gateway, wherein the wireless network gateway separates the data packets from the UDP packet and GTP packets based on the wrapper, and forwards the data packets over a communication network.

6 Claims, 9 Drawing Sheets

GENERAL PACKET RADIO SERVICE TUNNELING PROTOCOL MULTIPLEXING

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some implementations, communication systems, such as Long Term Evolution (LTE) communication systems may employ relay nodes that can act as an intermediary between a macro LTE access node or base station and the end wireless communication devices. Accordingly, when a wireless communication device requires a communication, the device may transmit data to the relay node, which in turn, transmits the data to the macro LTE access node. Similarly, when data is to be received by the wireless communication device, the macro LTE access node may transmit data to the wireless relay node, which forwards the data to the end wireless communication device.

However, while relay nodes may provide an effective method of distributing wireless resources and signaling to wireless communication devices, it may become inefficient for the macro access node and the relay nodes to manage packets for the different wireless device communications. In particular, encapsulating data packets for individual devices may create overhead, as headers for each of the packets may use valuable resources that could otherwise be allocated to other operations.

OVERVIEW

The technology disclosed herein enhances the efficiency in communicating data between wireless access nodes and network gateways. In one implementation, a method of operating a communication system to enhance data communications between a wireless access node and a wireless network gateway includes, in the wireless access node, receiving data packets, via wireless signaling, from a plurality of wireless communication devices. The method further provides, in the wireless access node generating GPRS Tunneling Protocol (GTP) packets for the data packets, and generating a wrapper for the GTP packets, wherein the wrapper comprises metadata to multiplex the GTP packets in a user datagram protocol (UDP) packet. The method also includes transferring, in the UDP packet, the wrapper and the GTP packets for delivery to the wireless network gateway. The method further provides, in the wireless network gateway, receiving the UDP packet, separating the data packets from the UDP packet and the GTP packets based at least on the wrapper, and transferring the data packets to corresponding network destinations for the plurality of wireless communication devices.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
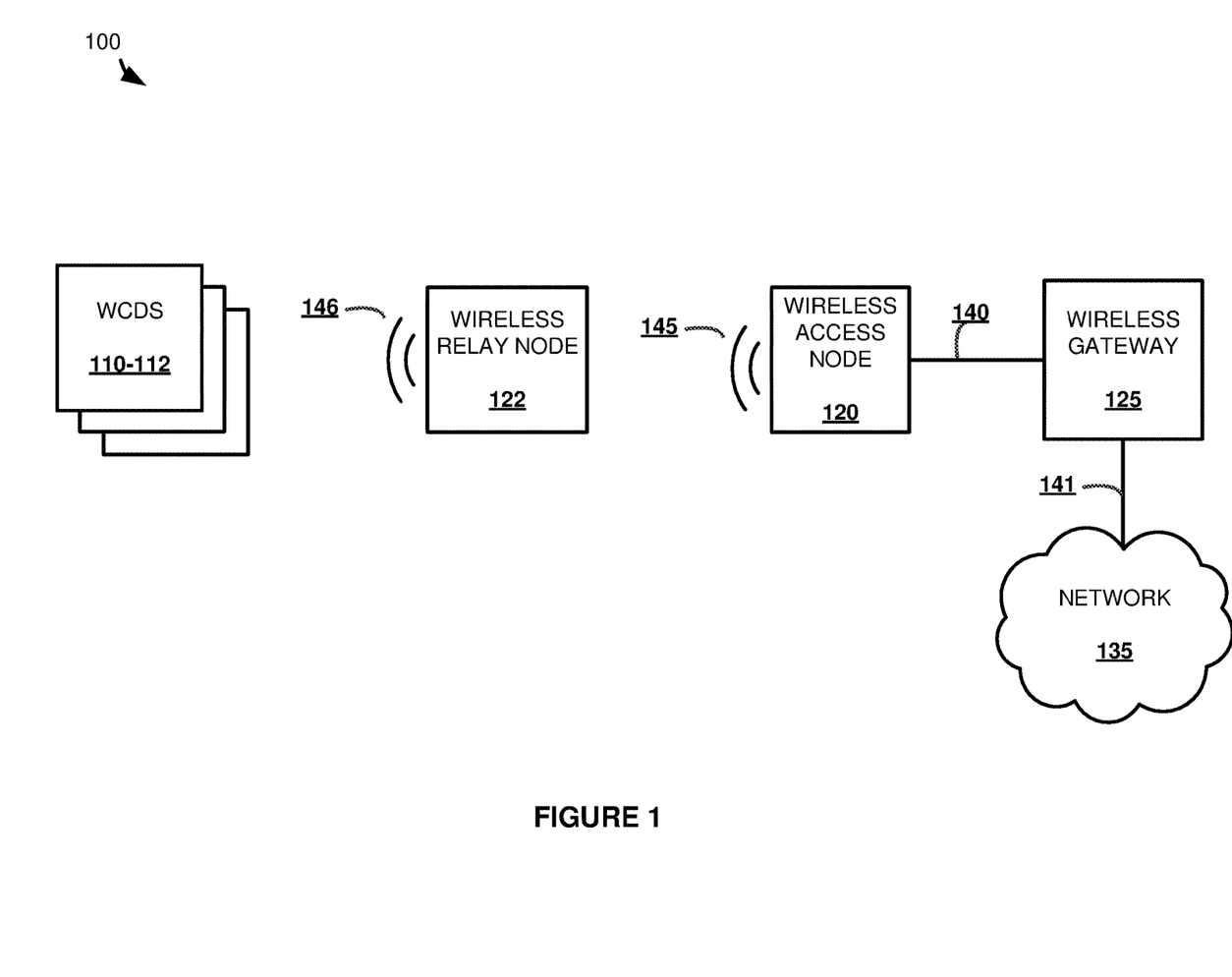
FIG. 1 illustrates a communication system to multiplex data communications between wireless access nodes and wireless gateways according to one implementation.

FIG. 1 illustrates a communication system 100 to multiplex data communications between wireless access nodes and wireless gateways according to one implementation. Communication system 100 includes wireless communication devices (WCDs) 110-112, wireless access node 120, wireless relay node 122, wireless gateway 125, and network 135. Wireless access node 120 exchanges wireless signaling 145 with wireless relay node 122, while wireless relay node 122 exchanges wireless signaling 146 with WCDs 110-112. Wireless access node 120 further communicates with wireless gateway 125 over communication link 140, and wireless gateway 125 further communicates with network 135 over communication link 141.

In operation, wireless relay node 122 is used to provide wireless communication services to applications and processes on WCDs 110-112. To provide the services, wireless relay node 122 communicates with wireless access node 120, which may comprise a macrocell eNodeB or any other similar wireless base station that connects to a Long Term Evolution (LTE) network. In particular, wireless relay node 122 may transfer an attach request to wireless access node 120, and in response to the request, wireless access node 120 may provide LTE wireless resources to wireless relay node 122, permitting the relay node to deliver wireless signaling to end wireless devices. This wireless signaling to the end wireless devices may comprise LTE signaling, WiFi signaling, or any other similar wireless communication format signaling.

Here, to provide the required communications to WCDs 110-112, the wireless access nodes, which include wireless access node 120 and wireless relay node 122, may employ General Packet Radio Service (GPRS) Tunneling Protocol (GTP). GTP is a group of IP-based communications protocols used to carry packets over Global System for Mobile Communications (GSM), Universal Mobile Telecommunications System (UMTS), and LTE networks. In particular, when a communication is received from a WCD in WCDs 110-112, wireless access node 120 and/or wireless relay node 122 may encapsulate the communication into a GTP packet before forwarding the communication across the network. This is used to separate and identify the traffic for the individual device communications. In generating the encapsulated packet with the communication for the WCD, headers and other overhead is created to provide information about the packet.

In the present implementation, to provide the communications for WCDs 110-112, wireless relay node 122 or, in some examples wireless access node 120, may generate a wrapper for the GTP packets and transfer both the wrapper and the GTP packets in a user datagram protocol (UDP) packet over the network. This wrapper includes metadata to multiplex the GTP packets from multiple devices into the single UDP packet. In particular, this metadata may include information about the offset of each GTP packet within the UDP packet, information about the length of each GTP packet within the UDP packet, or any other similar information to differentiate the various GTP packets within a single UDP packet. For example, if wireless relay node 122 employed wrapper generation, wireless relay node 122 would receive data packets from WCDs 110-112, generate GTP packets for the received data packets, and generate a wrapper for the GTP packets. Once generated, the GTP packets along with the generated wrapper may be transferred as a UDP packet over the network to a wireless gateway 125. Wireless gateway 125 may then use the information provided in the wrapper to separate the various data packets from WCDs 110-112.

Figure 2:
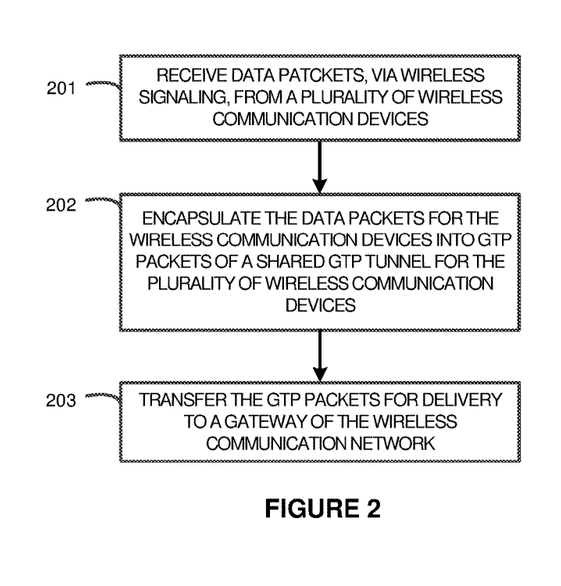
FIG. 2 illustrates a method of operating a wireless access node to multiplex data communications for multiple wireless communication devices according to one implementation.

To further demonstrate the operations of communication system 100, FIG. 2 is provided. FIG. 2 illustrates a method of operating a wireless access node to multiplex data communications for multiple wireless communication devices according to one implementation. The operations of FIG. 2 are referenced parenthetically in the paragraphs that follow with reference to the systems and elements of communication system 100 in FIG. 1. In particular, the GTP multiplexing operations will be described with reference wireless relay node 122, although it should be understood that similar operations could be provided by wireless access node 120 when multiple devices are provided wireless services by wireless access node 120.

As depicted in FIG. 2, wireless relay node 122, receives data packets, via wireless signaling, from a plurality of WCDs 110-112 (201). As the data packets are received, which in some examples comprise IP packets or IP datagrams, wireless relay node 122 generates GTP packets for the data packets, and generates a wrapper for the GTP packets, wherein the wrapper comprises metadata to multiplex the GTP packets in a UDP packet (202). In particular, this metadata may include information about the number of different GTP packets included in the UDP packet, the length of each of the GTP packets in the UDP packet, the offset of each of the GTP packets in the UDP packet, or any other similar information to separate or differentiate the different GTP packets for the various communications. Once the wrapper and GTP packets are generated for the UDP packet, wireless relay node 122 may transfer the UDP packet for delivery to a wireless gateway, such as wireless gateways 125, for the wireless communication network (203).

Here, to transfer the UDP packet to the wireless gateway, wireless relay node 122 transfers the UDP packet, including the wrapper and GTP packets, to wireless access node 120, which forwards the UDP packet to the appropriate wireless gateway of the wireless network. Although not illustrated in the example of FIG. 1, it should be understood that multiple wireless devices, including wireless relay node 122, may be communicatively coupled to wireless access node 120, wherein the wireless devices may include end wireless communication devices or additional wireless relay nodes. Accordingly, in some implementations, in addition to, or in place of, the wrapper generation operations of wireless relay node 122, wireless access node 120 may generate a wrapper to multiplex multiple GTP packets for wireless devices communicatively coupled to wireless access node 120.

Figure 3:
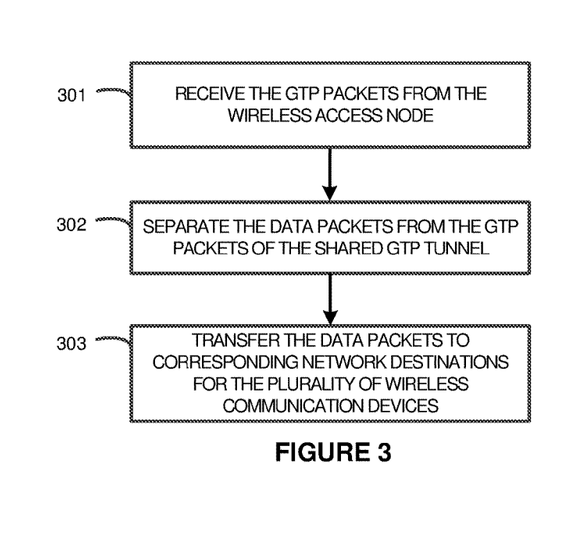
FIG. 3 illustrates a method of operating a wireless gateway to separate data communications from a user datagram protocol (UDP) packet for multiple wireless communication devices according to one implementation.

Referring now to FIG. 3, FIG. 3 a method of operating a wireless gateway to separate data communications from a user datagram protocol (UDP) packet for multiple wireless communication devices according to one implementation. The operations of FIG. 3 are referenced parenthetically in the paragraphs that follow with reference to the systems and elements of communication system 100 in FIG. 1. In particular, the operations will be described with reference wireless gateway 125, although it should be understood that other gateways may exist within an LTE network. Further, the operations of FIG. 3 are described with reference to packets being wrapped at wireless relay node 122, although it should be understood that similar operations could be applied to packets that are wrapped at wireless access node 120.

As previously described in FIG. 2, wireless access nodes, including wireless relay nodes, may generate a wrapper for GTP packets, wherein the wrapper includes metadata to multiplex and identify the different GTP packets within a UDP packet. For example, the metadata of the wrapper may include offset information for each of the GTP packets, size information for each of the GTP packets, information about the number of GTP packets in the UDP packet, or any other similar information. The wireless gateway receives the UDP packet from the wireless access node (301), and separates the data packets from the UDP packet and GTP packets based at least on the wrapper (302).

For example, if a UDP packet transferred from wireless relay node 122 included three GTP packets for three different communications, wireless gateway 125 may receive the packet, and use the included wrapper to determine which portion of the UDP packet belonged to which GTP packet. Once the GTP packets are identified within the UDP packet, the data packets within the GTP packets may be separated from the GTP packets. After separation from the UDP packet and the GTP packets, the data packets may be forwarded over network 135 to the appropriate destination. This destination may be another wireless device, a server, or some other service addressable by a wireless device over network 135.

Figure 4:
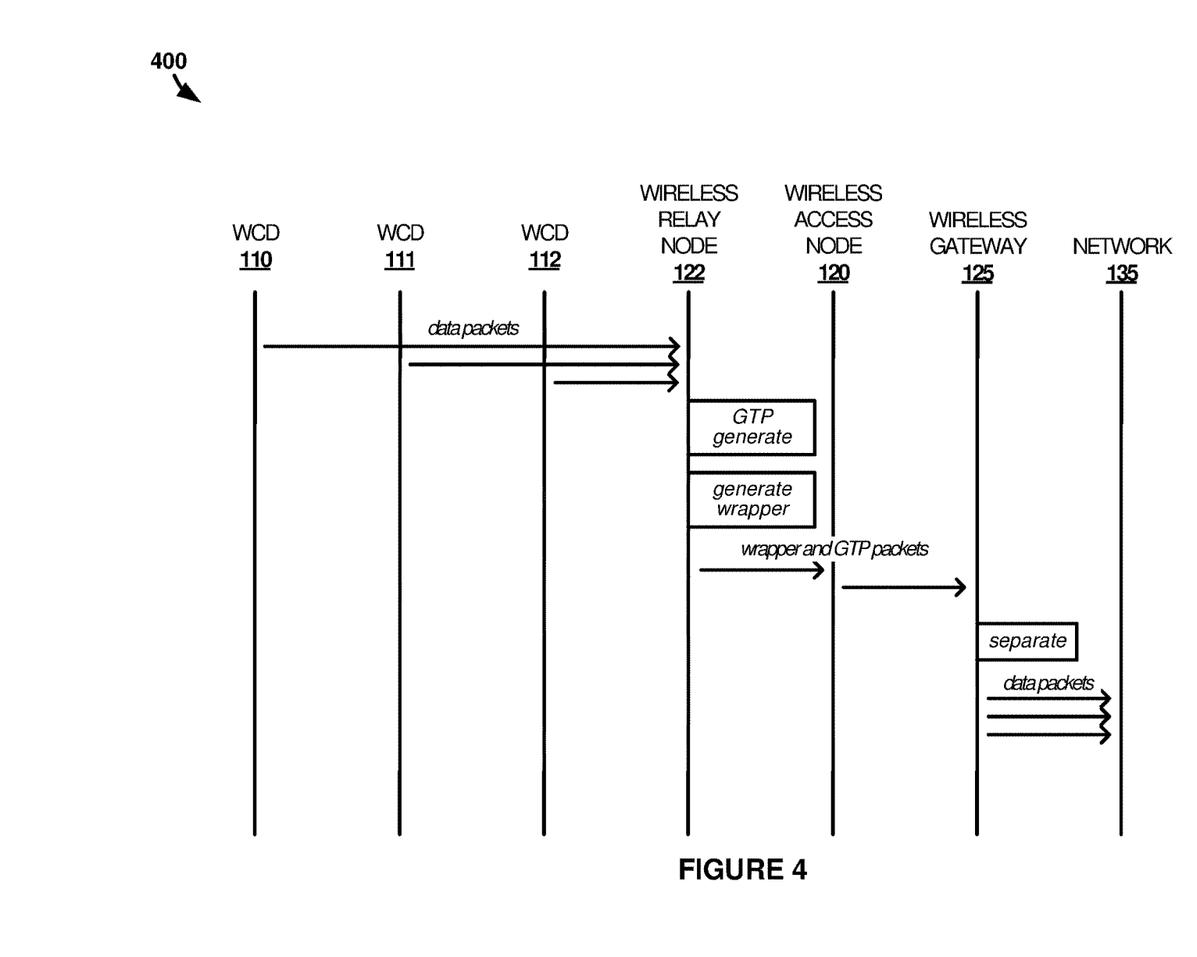
FIG. 4 illustrates a timing diagram of transferring data communications using user datagram protocol (UDP) according to one implementation.

FIG. 4 illustrates a timing diagram 400 of transferring data communications using UDP according to one implementation. Timing diagram 400 includes systems and elements of communication system 100 of FIG. 1. Timing diagram 400 provides an example of multiplexing GTP packets at a wireless relay node, however, it should be understood that similar operations may be used by any wireless access node of a wireless network, including wireless access node 120.

As depicted WCDs 110-112 transfer data packets to wireless relay node 122, wherein the data packets may comprise data communications for any application or process executing on the individual devices. Once received, wireless relay node 122 generates GTP packets for the received data packets, and further generates a wrapper for the GTP packets within a UDP packet. This wrapper is used to multiplex the plurality of GTP packets within a single UDP packet. In particular, the wrapper may act as a header with metadata that indicates the number of GTP packets included within the UDP packet, the length of each of the GTP packets, the offset of each of the GTP packets within the UDP packet, or any other similar information, including combinations thereof.

After generating the GTP packets and the wrapper for the GTP packets, wireless relay node 122 transfers the wrapper with the GTP packets as a UDP packet to wireless gateways 125 via wireless access node 120. In response to receiving the packets, wireless gateway 125, which may comprise a serving and/or packet data network gateways for wireless relay node 122, separates the data packets from the UDP packet based at least partially on the wrapper provided with the GTP packets. In some implementations, wireless gateway 125 may parse the metadata provided in the wrapper from wireless relay node 122 to differentiate between each of the GTP packets included in the communication. Once each of the GTP packets are separated from one another based on the information provided in the wrapper, wireless gateway 125 may then separate the corresponding data packets from each of the GTP packets, and forward the data packets over network 135 to the corresponding network destination.

Although illustrated in the example of FIG. 4, as generating the GTP packets and the wrapper at the same node, it should be understood that in some implementations the wrapper may be generated at wireless access node 120. In particular, wireless relay node 122 may generate the GTP packets for WCDs 110-112 and transfer the GTP packets in a data packet to wireless access node 120. Once received, wireless access node 120 may generate the wrapper for the GTP packets corresponding to WCDs 110-112.

Figure 5:
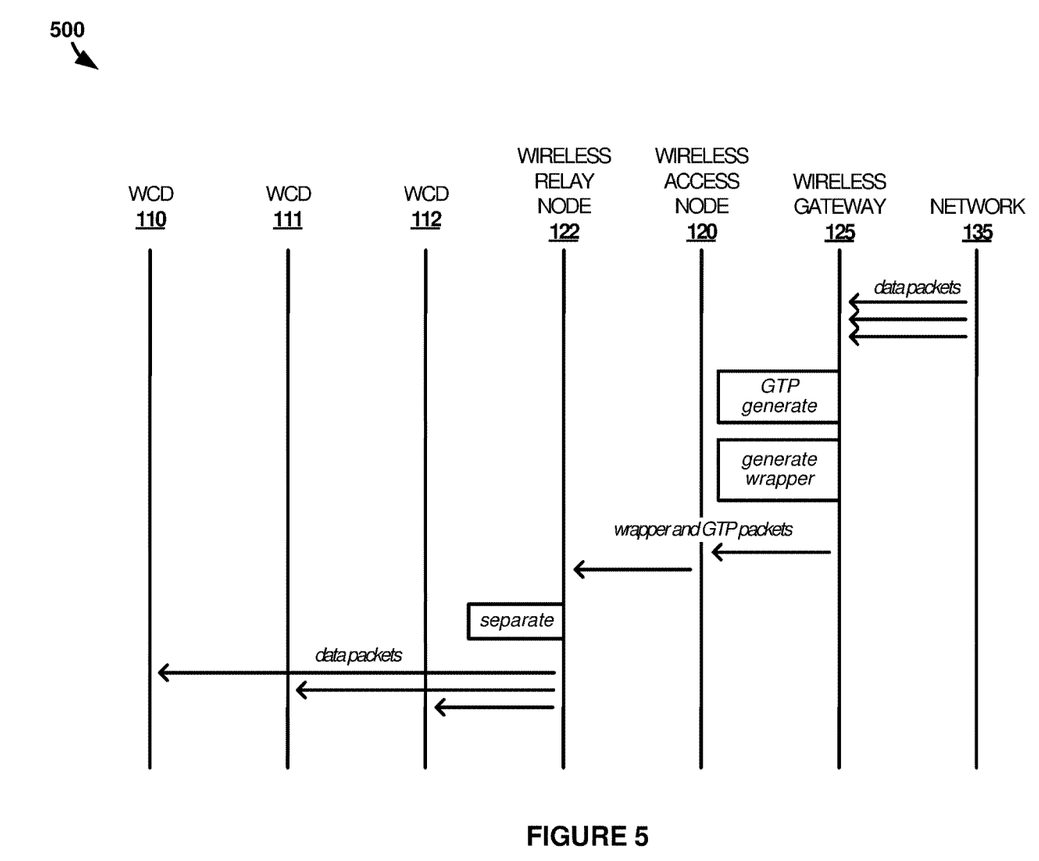
FIG. 5 illustrates a timing diagram of transferring data communications using GPRS Tunneling Protocol (GTP) extension headers and multiplexing according to one implementation.

FIG. 5 illustrates a timing diagram 500 of transferring data communications using UDP according to one implementation. Timing diagram 500 includes systems and elements of communication system 100 of FIG. 1. Timing diagram 500 provides an example of multiplexing GTP packets at a wireless gateway and providing the multiplexed packets to a wireless relay node. Although illustrated with providing multiplexed GTP packets between a wireless gateway and a wireless relay node in the present implementation, it should be understood that similar operations may be applied between a wireless gateway and a macro wireless access node, such as wireless access node 120.

As depicted, data packets are received from network 135 at wireless gateway 125. In response to receiving the packets, wireless gateway 125 encapsulates the data packets into GTP packets and generates a wrapper for the GTP packets to be transferred in a UDP packet. Similar to the operations described above with respect to FIG. 4, this wrapper defines metadata indicating which portions of the UDP packet belong to which of the GTP packets, wherein the metadata may indicate a quantity of GTP packets included in the UDP packet, the length of each of the GTP packets in the UDP packet, the offset for the beginning of each of the GTP packets, or any other similar information to separate the data for each of the GTP packets.

Once the wrapper and the GTP packets are generated, wireless gateway transfers the UDP packet with the GTP packets and the wrapper to wireless relay node 122 via wireless access node 120. In response to receiving the UDP packet, wireless relay node 122 extracts or separates the data packets from the UDP packet and the GTP packets based at least in part on the included wrapper. To provide this operation, wireless relay node 122 may parse the wrapper to identify portions of the UDP packet that belong to each of the GTP packets. Once parsed and the GTP packets are identified, wireless relay node 122 may separate or extract the data packets from the GTP packets and transmit the data packets to their corresponding WCD of WCDs 110-112.

Although illustrated in the examples of FIGS. 4 and 5 as communicating a wrapper for the GTP packets between a wireless relay node and a wireless gateway, it should be understood that wireless access node 120 may provide similar operations. For example, wireless access node 120 and a second wireless gateway may multiplex and demultiplex GTP packets from multiple wireless devices in a single UDP packet. Accordingly, if multiple wireless devices were coupled to wireless access node 120, which may include multiple wireless relay nodes or end wireless devices, wireless access node 120 may receive data packets from each of the devices, generate GTP packets for the data packets and a wrapper for the GTP packets, and transfer the GTP packets and wrapper as a UDP packet over the wireless network to a corresponding gateway. The gateway may then separate the data packets from the UDP packet and forward the packets over the network. In some implementations, the data packets received by wireless access node 120 may include data packets for end wireless devices, but may also include UDP packets from one or more wireless relay nodes communicatively coupled to wireless access node 120. Similar operations may also be provided in the reverse condition, wherein a network gateway receives data packets over network 135, generates UDP packets with wrappers and GTP packets, and provides them to wireless access node 120. Wireless access node 120 may the separate the data packets from the UDP packets and the GTP packets and transmit the data packets to the corresponding wireless device.

Figure 6:
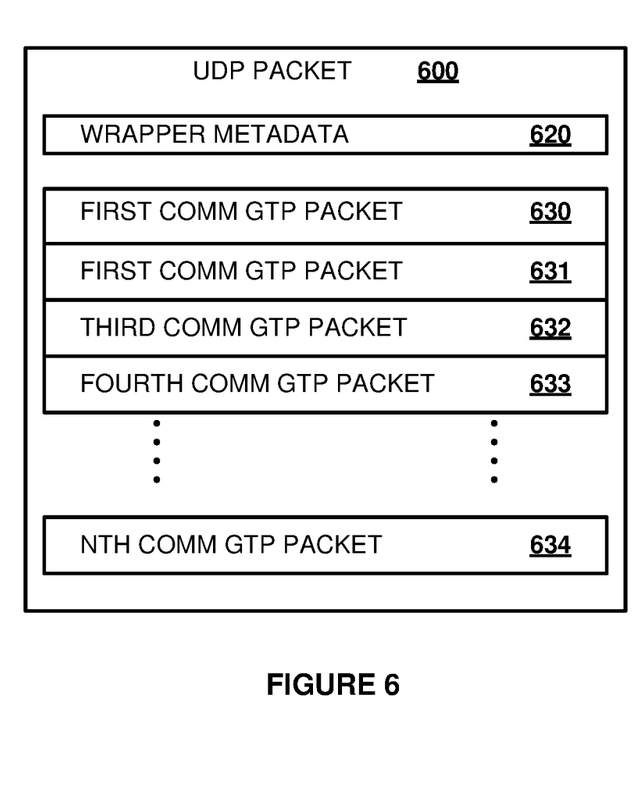
FIG. 6 illustrates a user datagram protocol (UDP) packet according to one implementation.

FIG. 6 illustrates a UDP packet 600 according to one implementation. UDP packet 600 includes GTP wrapper metadata 620 and communication (comm) GTP packets 630-634. Communication GTP packets 630-634 are representative of GTP packets generated for data packets to be communicated between a wireless access node, such as a macro wireless access node or wireless relay node, and a wireless gateway of the wireless network.

As described herein, a wireless access node may provide wireless communication services to a plurality of wireless communication devices, wherein the wireless communication devices may include wireless relay nodes, as well as end user wireless communication devices. To transfer data packets for the wireless devices to the end destinations over a communication network, the wireless access node may employ UDP packets to encapsulate the data for the connected devices. In at least one implementation, as data packets are received from wireless devices, the wireless access node may generate GTP packets for the data packets, wherein GTP is used as a tunneling protocol between the wireless access node and the gateway of the wireless network.

In the present example, data packets that are received by the wireless access node are encapsulated within communication GTP packets 630-634, wherein each of the packets correspond to a different communication. For example, first communication GTP packet 630 may correspond to a communication from a first end wireless communication device, while second communication GTP packet 631 may correspond to a communication from a second end wireless communication device. These GTP packets may include a GTP header, as well as a GTP payload, which includes the data packet transferred from the wireless device.

Here, in addition to generating the GTP packets for the communications from the wireless devices, the wireless access node will further generate a wrapper with wrapper metadata 620, wherein the wrapper metadata is used to define which portions of a UDP packet belong to which GTP packet. This metadata may include, but is not limited to, the number of GTP packets included within UDP packet 600, the length of each of each of the GTP packets within UDP packet 600, or the offset for the state of each of the GTP packets in UDP packet 600, including combinations thereof. Once the wrapper is generated, the wireless access node may transfer the wrapper and the GTP packets as UDP packet 600 for delivery to the appropriate wireless gateway of the wireless network.

The wireless gateway will receive UDP packet 600 and parse the packet using information provided in wrapper metadata 620 to separate communication GTP packets 630-634. As a result, rather than requiring the wireless gateway to search the entire UDP packet for the separate GTP packets, the wrapper metadata may be used to quickly identify and separate the GTP packets. Once separated, the data packets within the GTP packets may be forwarded to the appropriate network destinations.

Although illustrated in the previous example as transferring a UDP packet between a wireless access node and a wireless network gateway, it should be understood that similar operations may be applied in transferring data packets from the gateway to the wireless access node. In some implementations, the wireless access node may receive data packets to be transferred to wireless communication devices over the wireless access node. Responsive to receiving the data packets, the gateway may generate GTP packets and a wrapper for the GTP packets in a UDP packet, and transfer the UDP packet with the wrapper and GTP packets for delivery to the wireless access node. The wireless access node may then separate the data packets based at least on the wrapper and transmit the data packets to the corresponding device.

Figure 7:
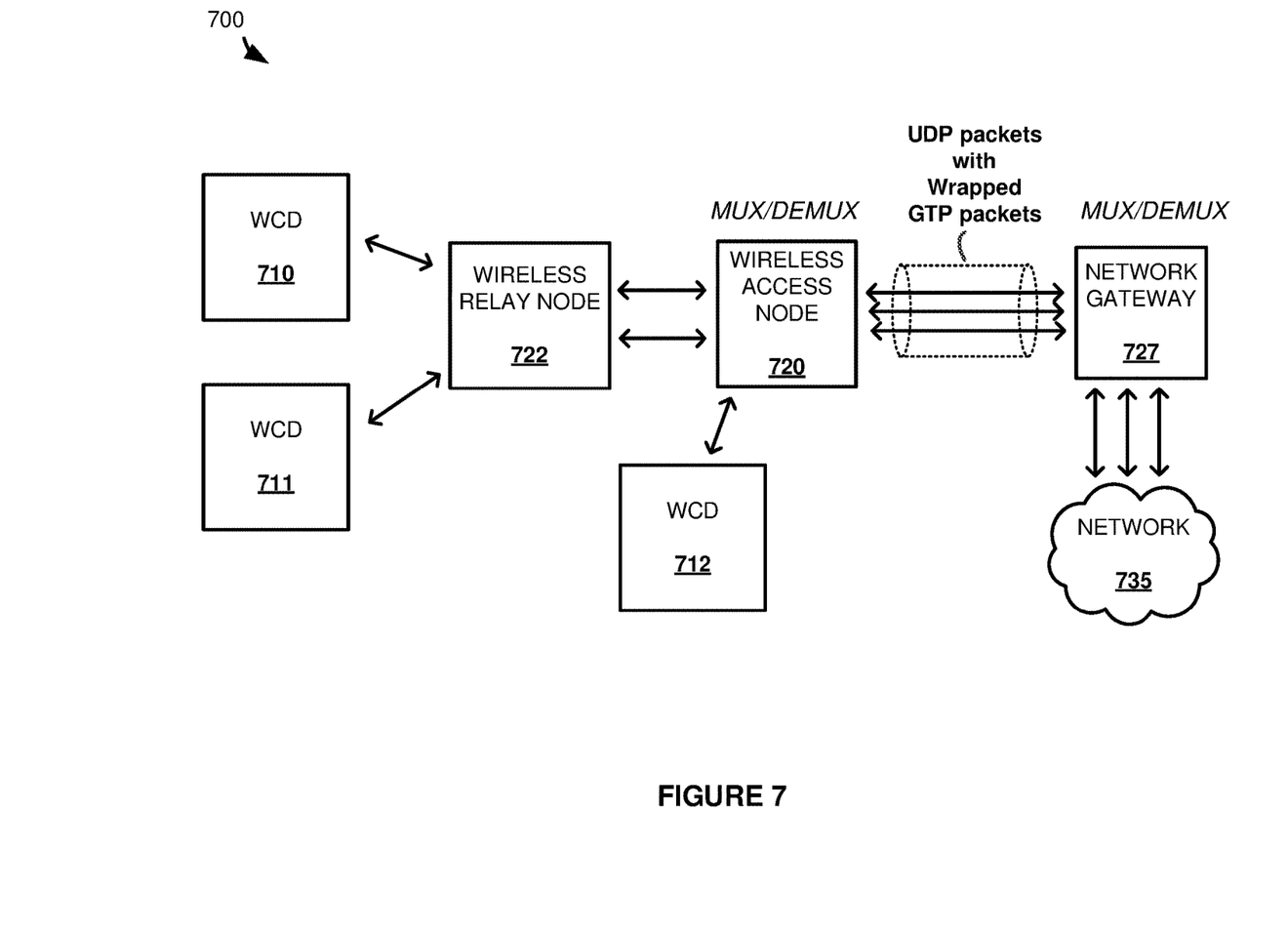
FIG. 7 illustrates an operational scenario of transferring data communications over a communication network according to on implementation.

FIG. 7 illustrates an operational scenario 700 of transferring data communications over a communication network according to on implementation. Operational scenario 700 includes WCDs 710-712, wireless relay node 722, wireless access node 720, network gateway 727, and network 735. Although illustrated in the present implementation with a single network gateway, it should be understood that a wireless service provider may provide a plurality of network gateways, including serving gateways, packet data network gateways, and the like.

In the present example, wireless access node 720 provides wireless signaling to wireless relay node 722 and WCD 712, and wireless relay node 722 acts as an intermediary access node and provides wireless signaling to WCDs 710-711. To provide the required communications to WCD 712 and wireless relay node 722, wireless access node 720 communicates with network gateway 727 using UDP packets, wherein the UDP packets each include a wrapper and one or more GTP packets. In at least one implementation, data communications are received from wireless relay node 722 and WCD 712 by wireless access node 720. In response to receiving the data communications, which may comprise data packets or datagrams for WCD 712, and UDP packets from wireless relay node 722, wireless access node 720 may generate GTP packets for the received data packets and generate wrappers for each UDP packet to be transferred. As the UDP packets are generated, the UDP packets are transferred for delivery to network gateway 727.

In response to receiving each of the UDP packets, network gateway 727 may separate the data packets from the UDP packet and the GTP packets based on the wrapper provided with the UDP packet. This wrapper may indicate metadata information to separate each of the data packets including the number of FTP packets included in the UDP packet, the length of each of the GTP packets, the offset of the GTP packets within the UDP packet or any other similar information related to separate the GTP packets in the UDP packet. Consequently, rather than parsing the UDP packet and searching for each of the GTP packets in the UPD packet, the wrapper may be used to efficiently identify the start points of each of the GTP packets. Once the GTP packets are identified, the data packets within the GTP packets may be extracted and forwarded over network 735 to the appropriate destination.

Similar to the operations described above with regard to multiplexing GTP packets at wireless access node 720, network gateway 727 may also multiplex GTP packets in a UDP packet prior to delivery to a wireless access node. In at least one example, network gateway 727 may receive data packets to be transferred from wireless access node 720 to wireless relay node 722 and WCD 712. In response to receiving the packets, network gateway 727 may generate GTP packets for the data packets, and may further generate a wrapper for the GTP packets within a UDP packet. This metadata will assist wireless access node 720 in separating or demultiplexing each of the GTP packets from the UDP packet. For example, the metadata may include information about the number of GTP packets included in a particular UDP packet, and may further include information about the offset where each of the GTP packets starts within the GTP packet.

Once the wrapper and the GTP packets are generated for a particular UDP packet, the UDP packet may be transferred from network gateway 727 to wireless access node 720. In response to receiving the UDP packets, wireless access node may separate or demultiplex the GTP packets from the UDP packet based on the wrapper, and identify the separate data packets to be transferred to wireless relay node 722 and WCD 712. Once the separate data packets are identified, wireless access node 720 may transfer the required data packets to the appropriate devices. These data packets may include user data packets, in the example of WCD 712, and may include second UDP packets in the example of wireless relay node 722. Accordingly, once received by wireless relay node 722, wireless relay node may identify user data packets in the second UDP packets, and transfer the user data packets to the corresponding wireless device of WCD 710-711.

Figure 8:
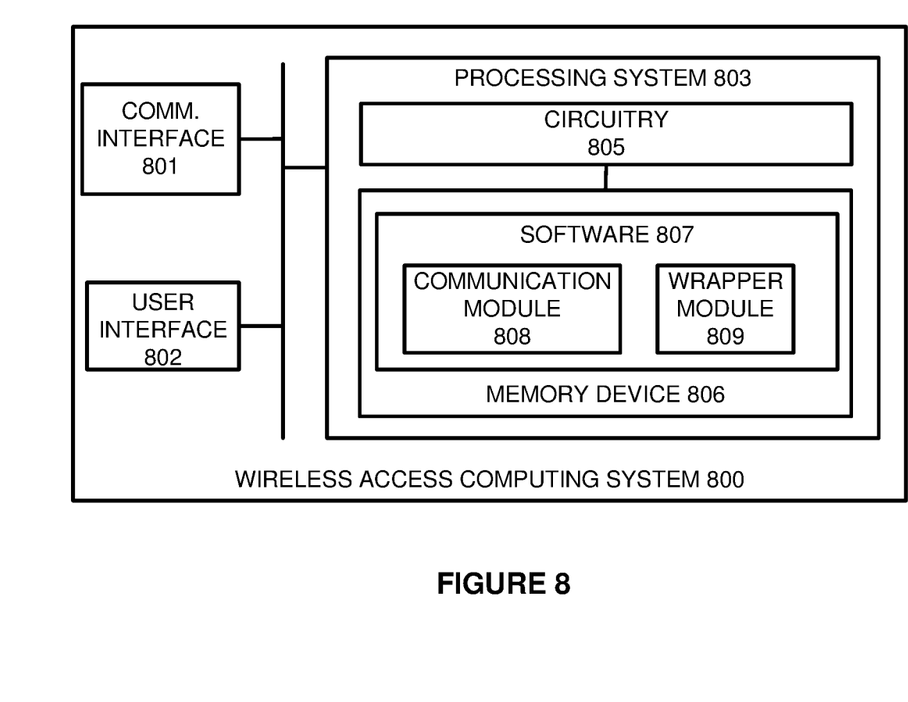
FIG. 8 illustrates a wireless access computing system according to one implementation.

FIG. 8 illustrates a wireless access computing system 800 according to one implementation. Wireless access computing system 800 is representative of any computing system or systems with which the various operational architectures, processes, scenarios, and sequences disclosed herein for a wireless access node or a wireless relay node may be implemented. Wireless access computing system 800 is an example of wireless relay nodes 122 and 722, wireless access nodes 120 and 720, or any other wireless access or relay node capable of GTP tunneling. Wireless access computing system 800 comprises communication interface 801, user interface 802, and processing system 803. Processing system 803 is linked to communication interface 801 and user interface 802. Processing system 803 includes processing circuitry 805 and memory device 806 that stores operating software 807. Wireless access computing system 800 may include other well-known components such as a battery and enclosure that are not shown for clarity.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 communicates with various wireless devices using wireless signaling, wherein the wireless devices may include end WCDs or wireless relay nodes. Communication interface 801 may further communicate with a network gateway of the wireless service provider. This communication with the network gateway may come via wired communication or may use, in part, wireless signaling over one or more second wireless access nodes.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes communication module 808 and wrapper module 809, although any number of software modules may provide the same operation. Operating software 807 may further include an operating system, utilities, drivers, network interfaces, applications, or some other type of software. When executed by processing circuitry 805, operating software 807 directs processing system 803 to operate wireless access computing system 800 as described herein.

In at least one implementation, communication module 808, when read and executed by processing system 803, directs processing system 803 to receive data packets, via communication interface 801 from wireless communication devices. These data packets may include IP packets wirelessly transmitted from end user wireless devices, as well as data packets (GTP packets) transferred from other wireless access nodes (or wireless relay nodes). As the packets are received from the various devices, wrapper module 809 directs processing system 803 to generate GTP packets for the data packets, and generate a wrapper for the GTP packets, wherein the wrapper comprises metadata to multiplex the GTP packets into a single UDP packet. Once the GTP packets and wrapper are generated, communication module 808 directs processing system 803 to transfer, via communication interface 801, the wrapper and the GTP packets for delivery to a wireless network gateway in the UDP packet. This wireless network gateway may comprise a serving gateway or a packet data network gateway associated with wireless access computing system 800. For example, if wireless access computing system 800 comprises a relay node, the UDP may be transferred for delivery to a relay packet data network gateway of the wireless network. However, if wireless access computing system 800 comprises a macro wireless access node, wireless access computing system 800 may transfer the UDP to a packet data network gateway corresponding to the macro access node.

In addition to the operations described above for multiplexing GTP communications using a wrapper, computing system 800 may further demultiplex or separate GTP packets from UDP packets in some implementations. In particular, communication module 808 directs processing system 803 to receive, via communication interface 801, UDP packets transferred by a wireless gateway of the wireless network. Once a UDP packet is received, wrapper module 809 directs processing system 803 to separate data packets included in the UDP packet based at least one a wrapper provided by the wireless gateway. In at least one implementation, wireless access computing system 800 may parse the UDP packet based on the wrapper to identify the GTP packets contained therein. Once the GTP packets are identified the data packets contained therein may be identified, and transferred to corresponding wireless communication devices communicating with wireless access computing system 800. These wireless communication devices may include end user wireless communication devices, or wireless relay nodes in some implementations.

Figure 9:
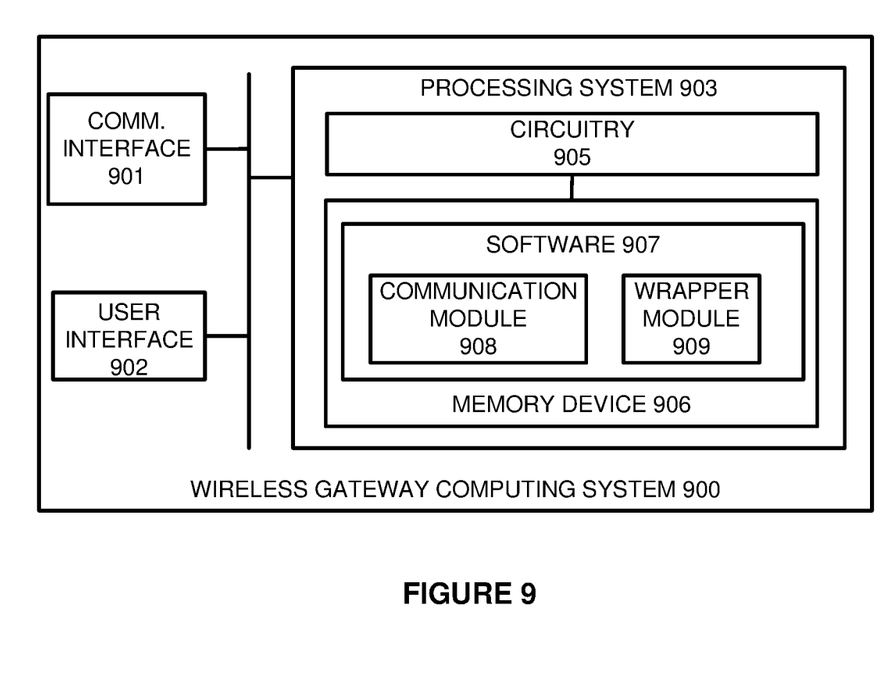
FIG. 9 illustrates a wireless gateway computing system according to one implementation.

FIG. 9 illustrates a wireless gateway computing system 900 according to one implementation. Wireless gateway computing system 900 is representative of any computing system or systems with which the various operational architectures, processes, scenarios, and sequences disclosed herein for a wireless gateway may be implemented. Wireless gateway computing system 900 is an example of wireless gateway 125 and wireless gateway 727, although other examples may exist. Wireless gateway computing system 900 comprises communication interface 901, user interface 902, and processing system 903. Processing system 903 is linked to communication interface 901 and user interface 902. Processing system 903 includes processing circuitry 905 and memory device 906 that stores operating software 907. Wireless gateway computing system 900 may include other well-known components such as a battery and enclosure that are not shown for clarity.

Communication interface 901 comprises components that communicate over communication links, such as network cards, ports, radio frequency (RF) transceivers, processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In particular, communication interface 901 is used to transfer and receive GTP packets with a wireless access node of the wireless network. This wireless access node may comprise a macro wireless access node or eNodeB, or may comprise a relay wireless access node of the wireless network.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes communication module 908 and wrapper module 909, although any number of software modules may provide the same operation. Operating software 907 may further include an operating system, utilities, drivers, network interfaces, applications, or some other type of software. When executed by processing circuitry 905, operating software 907 directs processing system 903 to operate wireless gateway computing system 900 as described herein.

In at least one implementation, wireless gateway computing system 900 provides GTP packet wrapping operations as described herein. In particular, communication module 908 directs processing system 903 to receive, via communication interface 901, a UDP packet transferred from a wireless access node of the wireless network. In response to receiving the UDP packet, wrapper module 909 directs processing system 903 to separate data packets from the UDP packet and the included GTP packets based on a wrapper included in the UDP packet. This wrapper may include metadata information related to the number of GTP packets included in the UDP packet, the length of each of the GTP packets, the start offset of each of the GTP packets within the UDP packet, or any other similar information. Once the various GTP packets are identified within the UDP packet, the data packets may be extracted from the GTP packets. In some implementations, the data packets may comprise IP packets or datagrams corresponding to packets transferred from end user devices. However, in other implementations, the data packets may comprise other UDP packets corresponding to packets transferred from other wireless relay nodes. Once the data packets are identified within the UDP packet, the data packets may be transferred over the network to the appropriate destination device.

Further, to provide communications to wireless communication devices in the network, communication module 908 may direct processing system 903 to receive data packets for delivery to the plurality of wireless communication devices. In response to receiving the data packets, wrapper module 909 directs processing system 903 to generate GTP packets for the data packets and generate a second wrapper for the GTP packets, wherein the wrapper includes metadata to multiplex the GTP packets in a UDP packet. Once the wrapper and GTP packets are generated, communication module 908 may direct processing system 903 to transfer, via communication interface 901 the UDP packet for delivery to the wireless access node associated with the data packets. In some implementations, this transfer may comprise a wired transfer to a macro wireless access node, however, in other implementations, the transfer may comprise a transfer of the UDP packet over a macro wireless access node to a wireless relay node.

Figure 10:
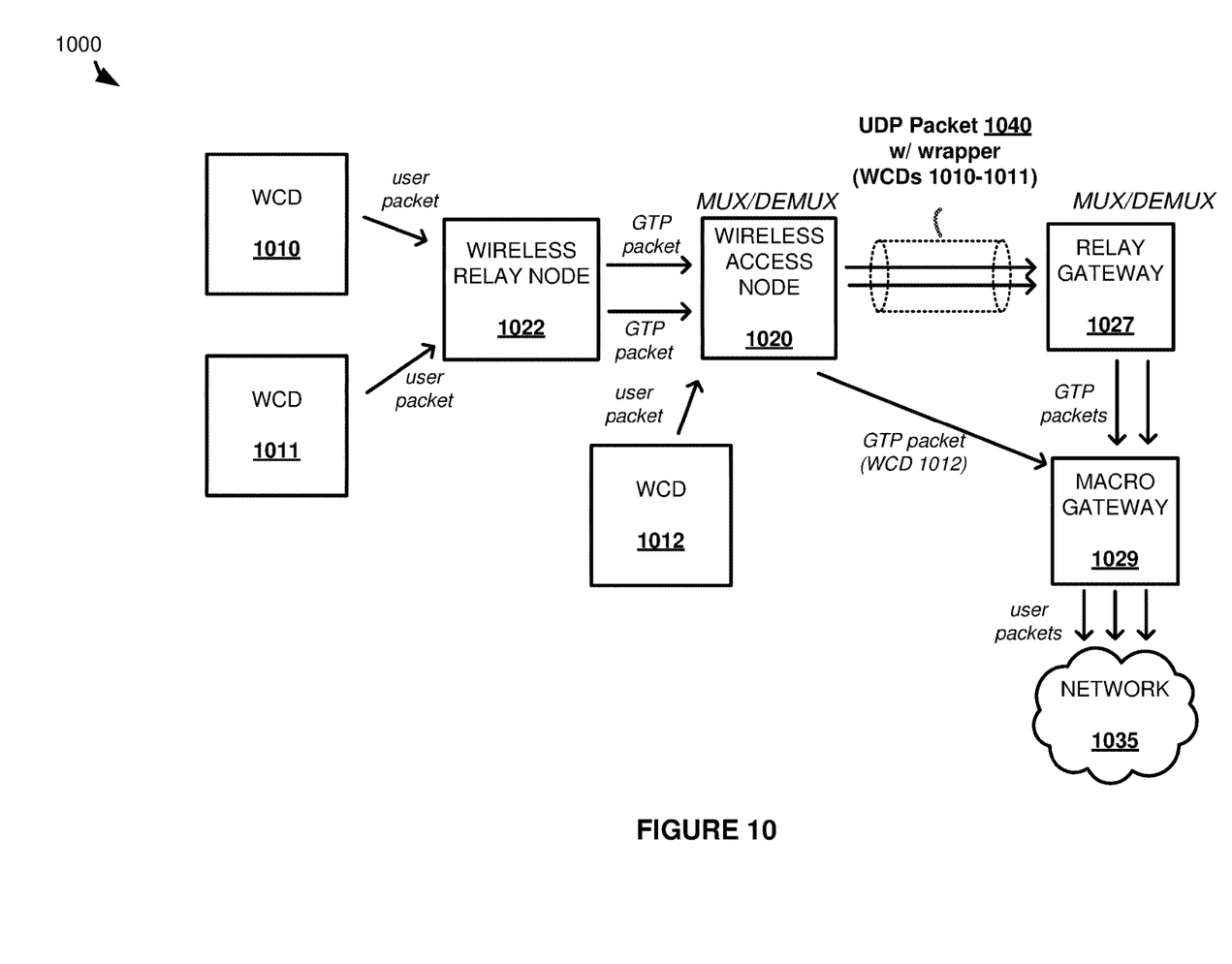
FIG. 10 illustrates operational scenario 1000 of transferring data communications over a communication network according to one implementation

FIG. 10 illustrates an operational scenario 1000 of transferring data communications over a communication network according to one implementation. Operational scenario 1000 includes WCDs 1010-1012, wireless relay node 1022, wireless access node 1020, relay gateway 1027, macro gateway 1029, and network 1035. Relay gateway 1027 is representative of a relay gateway to provide data routing over for wireless relay node 1022, and macro gateway 1029 is representative of a gateway to provide data routing for wireless access node 1020.

Here, unlike the previous examples described herein, wireless access node 1020 provides the multiplexing operations and demultiplexing operations for device communications that were received at wireless relay node 1022. In particular, wireless relay node 1022 is configured to receive data packets from WCDs 1010-1011. In response to receiving the data packets, wireless relay node 1022 will generate GTP packets for each of the data packets and forward the GTP packets as wireless signaling to wireless access node 1020. Once received by wireless access node 1020, wireless access node 1020 will generate a wrapper for the GTP packets corresponding to WCDs 1010 and 1011, wherein the wrapper is included in UDP packet 1040 with the GTP packets. This wrapper is used to multiplex the plurality of GTP packets for WCDs 1010-1011 into a single GTP packet that corresponds to wireless relay node 1022. In particular, this wrapper may provide information such as offset information for each of the GTP packets, the length of the GTP packets, or any other similar information to permit the gateways to more efficiently parse the plurality of GTP packets included in the communication.

Once the wrapper is included in the UDP packet with the GTP packets, the packet is transferred over the network to relay gateway 1027 that provides routing operations for wireless relay node 1022. In response to receiving the packet, relay gateway 1027 will demulitplex the plurality of GTP packets based on the wrapper. This demultiplexing permits relay gateway 1027 to separate the individual GTP packets for WCDs 1010-1011, and provide the individual GTP packets to macro gateway 1029. Macro gateway 1029, which corresponds to a serving or packet data network gateway for wireless access node 1020, extracts the user data from the individual GTP packets, and transfers the data over network 1035 to the required destination.

In addition to providing communications to wireless relay node 1022 in operational scenario 1000, wireless access node 1020 further receives a user packet from WCD 1012. In response to receiving the packet, a GTP packet is generated for the user packet and, unlike the packets from wireless relay node 1022, the GTP packet is forwarded to macro gateway 1029 without processing by relay gateway 1027. Further, because the user packet was not received by wireless relay node 1022, the packet is not multiplexed using the wrapper provided to relay gateway 1027. Once the GTP packet for WCD 1012 is transferred to macro gateway 1029, the user data may be extracted and forwarded over network 1035 to the required destination.

Returning to the elements of FIG. 1, WCDs 110-112 each comprise Radio Frequency (RF) communication circuitry and an antenna. The RF communication circuitry typically includes an amplifier, filter, modulator, and signal processing circuitry. WCDs 110-112 may each include a user interface, memory device, software, processing circuitry, or some other communication components. WCDs 110-112 may comprise telephones, computers, e-books, mobile Internet appliances, wireless network interface cards, media players, game consoles, or some other wireless communication apparatus, including various combinations thereof. In some implementations, WCDs 110-112 may comprise end wireless communication devices, however, it should be understood that at least one of WCDs 110-112 may represent a wireless relay node capable of providing wireless services to additional wireless devices.

Wireless access node 120 comprises RF communication circuitry and at least one antenna to provide wireless communication services to wireless relay node 122. The RF communication circuitry typically includes an amplifier, filter, RF modulator, and signal processing circuitry. Wireless access node 120 may comprise a router, server, memory device, software, processing circuitry, cabling, power supply, network communication interface, structural support, or some other communication apparatus.

Wireless relay node 122 comprises RF communication circuitry and at least one antenna to provide wireless communication services to first and second WCDs 110-112 and to communicate with wireless access node 120. The RF communication circuitry typically includes an amplifier, filter, RF modulator, and signal processing circuitry. Wireless relay node 122 may comprise a router, server, memory device, software, processing circuitry, cabling, power supply, network communication interface, structural support, or some other communication apparatus.

Wireless gateway 125 may comprise one or more computing systems capable of routing and managing communications across the LTE network. Wireless gateway 125 may include processing systems, storage systems, communication interfaces, user interfaces, and other similar computing systems. Wireless gateway 125 may comprise a serving gateway, a packet data network gateway, a relay serving gateway, a relay packet data network gateway, or some other similar gateway for the wireless network. In some implementations, the gateways for relay nodes and macro access node may be separated into separate gateways. Thus, wireless relay node 122 may be allocated one or more separate gateways than wireless access node 120.

Network 135 may comprise the wireless service provider network and may further include data service networks, such as the Internet, IMS, or some other network that provides data services to first and second WCDs 110-111. Communication network 135 may comprise switches, wireless access nodes, Internet routers, network gateways, application servers, computer systems, communication links, or some other type of communication equipment—including combinations thereof.

Wireless signaling 145 uses wireless links that use the air or space as transport media for LTE wireless communication format. Wireless signaling 146 uses wireless links that use the air or space as transport media for LTE, WiFi, or some other wireless communication format. Communication links 140-141 could use various communication protocols, such as Time Division Multiplex (TDM), Internet Protocol (IP), Ethernet, communication signaling, wireless communication signaling, or some other communication format—including combinations thereof. Communication links 140-141 could be direct links or may include intermediate networks, systems, or devices. For example, between wireless access node 120 and wireless gateway 125, one or more routers and alternative network gateways may be included in communication link 140.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a communication system to enhance data communications between a wireless relay node and a wireless network gateway, the method comprising:
   in the wireless relay node, wirelessly receiving first data packets from first wireless communication devices, generating first GPRS Tunneling Protocol (GTP) packets for the first data packets, and wirelessly transferring the first GTP packets that transport the first data packets to a wireless access node;
   in the wireless access node, wirelessly receiving the first GTP packets that transport the first data packets from the wireless relay node,
   generating a wrapper for the first GTP packets responsive to use of the wireless relay node, wherein the wrapper comprises metadata to multiplex the first GTP packets in a user datagram protocol (UDP) packet, and transferring the UDP packet to a wireless relay gateway, wherein the UDP packet transports the wrapper and the first GTP packets that transport the first data packets;
   in the wireless relay gateway, receiving the UDP packet and
   separating the first GTP packets from the UDP packet based at least on the wrapper;
   in the wireless relay gateway, transferring the first GTP packets that transport the first data packets to the wireless network gateway;
   in the wireless access node, wirelessly receiving second data packets from second wireless communication devices, generating second GTP packets for the second data packets, and transferring the second GTP packets that transport the second data packets to the wireless network gateway; and
   in the wireless network gateway, receiving the first GTP packets that transport the first data packets, receiving the second GTP packets that transport the second data packets, separating the first data packets from the first GTP packets, separating the second data packets from the second GTP packets, and transferring the first data packets and the second data packets from the wireless network gateway.

2. The method of claim 1 wherein the wireless network gateway comprises a packet data network gateway.

3. The method of claim 1 wherein the metadata in the wrapper comprises at least a quantity of the first GTP packets in the UDP packet, and an offset for each of the first GTP packets in the UDP packet.

4. A communication system to enhance communication efficiency between a wireless relay node and a wireless network gateway, the communication system comprising:
   the wireless relay node configured to wirelessly receive first data packets from first wireless communication devices, generate first GPRS Tunneling Protocol (GTP) packets for the first data packets, and wirelessly transfer the first GTP packets that transport the first data packets to a wireless access node;
   the wireless access node configured to receive the first GTP packets that transport the first data packets from the wireless relay node, generate a wrapper for the first GTP packets responsive to use of the wireless relay node, wherein the wrapper comprises metadata to multiplex the first GTP packets in a user datagram protocol (UDP) packet, and transfer the UDP packet to a wireless relay gateway, wherein the UDP packet transports the wrapper and the first GTP packets that transport the first data packets;

the wireless relay gateway configured to receive the UDP packet, separate the first GTP packets from the UDP packet based at least on the wrapper, and transfer the first GTP packets that transport the first data packets to the wireless network gateway;

the wireless access node configured to wirelessly receive second data packets from second wireless communication devices, generate second GTP packets for the second data packets, and transfer the second GTP packets that transport the second data packets to the wireless network gateway; and the wireless network gateway configured to receive the first GTP packets that transport the first data packets, receive the second GTP packets that transport the second data packets, separate the first data packets from the first GTP packets, separate the second data packets from the second GTP packets, and transfer the first data packets and the second data packets from the wireless network gateway.

5. The communication system of claim 4 wherein the wireless network gateway comprises a packet data network gateway.

6. The communication system of claim 4 wherein the metadata in the wrapper comprises at least a quantity of the first GTP packets in the UDP packet, and an offset for each of the first GTP packets in the UDP packet.

\* \* \* \* \*